US009483674B1

(12) United States Patent
Fink et al.

(10) Patent No.: US 9,483,674 B1
(45) Date of Patent: Nov. 1, 2016

(54) RFID TORQUE SENSING TAG SYSTEM FOR FASTENERS

(71) Applicant: The United States of America as represented by the Administrator of the National Aeronautics and Space, Washington, DC (US)

(72) Inventors: Patrick W. Fink, Missouri City, TX (US); Gregory Y. Lin, Friendswood, TX (US); Phong H. Ngo, Friendswood, TX (US); Timothy F. Kennedy, Houston, TX (US)

(73) Assignee: United States of America as represented by the Administrator of the National Aeronautics and Space Administration, Washington, DC (US)

( * ) Notice: Subject to any disclaimer, the term of this patent is extended or adjusted under 35 U.S.C. 154(b) by 384 days.

(21) Appl. No.: 14/200,122

(22) Filed: Mar. 7, 2014

(51) Int. Cl.
*G06K 7/10* (2006.01)
*F16B 31/02* (2006.01)
*G01L 5/24* (2006.01)

(52) U.S. Cl.
CPC ......... *G06K 7/10366* (2013.01); *F16B 31/028* (2013.01); *G01L 5/243* (2013.01)

(58) Field of Classification Search
CPC . G06K 7/10366; F16B 31/02; F16B 31/028; G01L 5/24; G01L 5/243; G01L 5/0004; B25B 23/14; B23P 19/067
See application file for complete search history.

(56) References Cited

U.S. PATENT DOCUMENTS

| 4,062,227 A | 12/1977 | Heyman |
| RE30,183 E | 1/1980 | Popenoe |
| 4,295,377 A | 10/1981 | Couchman |
| 4,553,124 A | 11/1985 | Malicki |
| 4,760,740 A | 8/1988 | Meisterling |
| 5,323,643 A | 6/1994 | Kojima et al. |
| 5,343,759 A | 9/1994 | Hesthamar et al. |
| 5,392,654 A | 2/1995 | Boyle |
| 5,437,525 A | 8/1995 | Bras |
| 5,499,540 A | 3/1996 | Whaley et al. |
| 5,675,087 A | 10/1997 | MacLauchlan et al. |
| 5,970,798 A | 10/1999 | Gleman et al. |
| 6,575,039 B2 | 6/2003 | Murai et al. |

(Continued)

FOREIGN PATENT DOCUMENTS

| JP | H11118637 | 4/1999 |
| JP | 2002004798 A | 1/2002 |
| JP | 2005114441 A | 4/2005 |

*Primary Examiner* — Firmin Backer
*Assistant Examiner* — Nay Tun
(74) *Attorney, Agent, or Firm* — Theodore U. Ro (57) ABSTRACT

The present invention provides an RFID-based torque sensor that can be used to quickly monitor off the shelf fasteners including fasteners that are used in expensive satellites or other uses where fastener failure can be very costly. In one embodiment, an antenna, RFID ring and spring comprise a sensor tag that can be interrogated with an interrogation signal produced by an interrogator device. When sufficient torque is applied to the fastener, an RFID circuit is connected, and produces a radio frequency (RF) signal that can be read by the interrogator. In one embodiment, the RFID circuit does not transmit when the spring member is not compressed, thereby indicating insufficient tensioning of the fastener. The present invention offers the ability to remotely, quickly, and inexpensively verify that any number of fasteners are torqued properly upon initial installation. Where applicable, the present invention allows low cost monitoring over the life of the fastener.

20 Claims, 5 Drawing Sheets

(56) References Cited

U.S. PATENT DOCUMENTS

| | | |
|---|---|---|
| 6,658,924 B2 | 12/2003 | Shirato et al. |
| 7,293,466 B2 | 11/2007 | Ohta et al. |
| 7,520,175 B2 | 4/2009 | Matsukawa et al. |
| 7,644,627 B2 | 1/2010 | Kibblewhite et al. |
| 7,698,949 B2 | 4/2010 | Akdeniz et al. |
| 8,156,820 B2 | 4/2012 | Dral et al. |
| 2008/0278319 A1 | 11/2008 | Meiksin et al. |
| 2010/0054891 A1 | 3/2010 | Nishida et al. |
| 2010/0261578 A1 | 10/2010 | Fujii et al. |
| 2012/0198941 A1* | 8/2012 | Smith .................. F16B 31/028 73/761 |
| 2013/0068031 A1 | 3/2013 | Mekid et al. |
| 2013/0186951 A1* | 7/2013 | Zhu .................. G06K 19/07779 235/375 |
| 2014/0129158 A1* | 5/2014 | Shea ..................... G01L 5/243 702/57 |
| 2014/0251027 A1* | 9/2014 | Hsieh ..................... G01L 5/24 73/862.21 |

\* cited by examiner

RFID TORQUE SENSING TAG SYSTEM FOR FASTENERS

STATEMENT OF GOVERNMENT INTEREST

The invention described herein was made in the performance of work under a NASA contract and is subject to the provisions of Section 305 of the National Aeronautics and Space Act of 1958, now codified in 51 U.S.C. 20135.

CROSS REFERENCE TO OTHER PATENT APPLICATIONS

None.

BACKGROUND OF THE INVENTION

1. Field of the Invention

The present invention relates generally to fastener tension sensing systems and more specifically to a RFID torque sensing tag system for fasteners.

2. Background of the Invention

Fasteners such as bolts, nuts, studs, washers, rivets, and the like are used in innumerable structures and machines. The need for improved fastener tension sensing systems is driven by costly documented failures in a wide range of application and for many different causes. Fastener failure analysis has shown that the causes include, but are not limited to, improper tightening, fatigue, tensile fracture, galling, insufficient preload, thread stripping, creep, stress relaxation, and self-loosening.

In many disasters related to fastener failures, better inspection could have been used to identify problems before failure. Such disasters include bridges, tunnels, and train rails where fastener failures are known to have caused disastrous results. Automotive failures occur due to common problems such as lug bolt failures in automotive racing. Aircraft are some of the most intensely inspected products in existence but entire fleets have been grounded due to loose bolts in certain subassemblies. Theme park accidents have been caused by fastener failures.

Accordingly, those of skill in the art acknowledge a long felt need exists for a relatively inexpensive fastener system to initially check recently installed fasteners and to monitor over time the tension of standard off the shelf or unmodified fasteners with minimal material costs and reduced labor costs.

However, the prior art does not teach such a system. Verifying that multiple fasteners are properly torqued, compressed, or otherwise secured to the desired tension to apply the required force is typically a labor intensive and/or expensive proposition.

Given the disasters that have occurred due to fastener failures, prior art attempts have been made to provide tension sensors that provide a wireless indication of the tension status of the fasteners. However, prior art fastener torque sensors tend to be expensive, complicated, and/or require modification of the fasteners. For example, US patent application 2013/0068011, also discussed below, teaches a rather complex housing mounted on each bolt with external wiring required to each pressure transducer, requires an external power source for each fastener, wiring connections between transponder and torque sensor, a transponder to communicate to communicate with an external base station, a controller circuit to compare the current tension with an initial tension, and also an RFID tag to uniquely identify each bolt. Such a system is likely to be cost prohibitive for most applications. Another example of prior art is US patent application 2013/0047408, also discussed below, which teaches an embedded ultrasonic transducer in the head of the bolt making the modified bolts expensive. Such a system is associated with very close read ranges, likely involving contact with the fastener. Integration of an RFID circuit with a bolt typically implies that the embedded RFID circuit will have a very small antenna and hence will be very range limited.

An RFID system comprises an interrogator, also called a reader, and a wireless tag wherein the interrogator transmits a signal to the tag, and the tag returns the desired information by radio wave. RFID technology enables the reading of multiple wireless tags, perhaps thousands of wireless tags at the same time or in a desired sequence. RFID devices may or may not utilize batteries. Strictly passive RFID tags require no active electronic circuits, such as power absorbing electronic switches. On the other hand, pseudo-passive RFID tags rectify the electromagnetic wave transmitted by the interrogator, and then use this power for operating integrated circuits. The primary advantages of the strictly passive and pseudo-passive tags are the independence from a battery, and typically lower weight and size. These RFID tags are also less costly, often to the extent to which they are deemed disposable. However, the prior art does not provide a way to utilize RFID technology for a low priced torque sensor that utilizes standard fasteners.

The following prior art patents and applications disclose various types of torque sensing systems, but do not address the problems discussed hereinbefore:

U.S. Pat. No. 8,156,820, issued Apr. 17, 2012 to Dral et al., discloses a device and method for tightening a bolt or a nut threaded on its end, which end extends through at least a first body and screws into a hole in a second body or extends through the second body into another nut. The device has gripping means co-acting with the bolt-head or the nuts. Means process a signal generated by sensor means subject to the axial force exerted on the surface of the first body by the bolt-head or the first nut, or on the surface of the second body by the second nut, and control the device such that the bolt-head or a nut is tightened subject to the axial force exerted on the surface of one of the bodies, which sensor means are in an annular body around the threaded hole between the bolt-head or first nut and the first body or between the second nut and second body.

U.S. Pat. No. 7,698,949, issued Apr. 20, 2010 to Akdeniz, et al., discloses apparatus, systems, and methods for inspecting and monitoring bolted joints of metallic and composite structures for defects such as delamination and fatigue cracking are provided that incorporate ultrasonic transducers with load bearing washers. These active washers may be used for inspecting and monitoring a structure beneath such load bearing fasteners as bolts and nuts. Active washers may be used for continuous, periodic, and controlled inspections of bolted joints. Ultrasonic transducers may be permanently applied to a surface of a washer or recessed in a cavity on a surface of the washer. Inspection signals may be transmitted from ultrasonic transducers into a structure and reflected in pulse-echo application or received by another active washer on the opposing side of the structure in a through-transmission application.

U.S. Pat. No. 7,644,627, issued Jan. 12, 2010 to Kibblewhite, et al., discloses thread forming fasteners for ultrasonic load measurement and control. An ultrasonic load measurement transducer is mated with a thread-forming fastener to provide a load indicating thread-forming fastener that can be used for the precise and reliable assembly of critical bolted joints, such as those in the automobile and aerospace industries, among others. Steps can then be taken to accurately measure and control the load in the thread-forming fastener during tightening, and to inspect the load in the thread-forming fastener after assembly. A similar result can be achieved for a thread-locking fastener by mating an ultrasonic transducer with the thread-locking fastener assembly.

U.S. Pat. No. 7,520,175, issued Apr. 21, 2010 to Matsukawa, et al., discloses a strain sensor whereby a fixing member is composed of an upper washer and a lower washer; and a sensor substrate is sandwiched and held by the upper and lower washers. A strain-detecting element is disposed on the sensor substrate. A strain sensor as configured above is fixed onto a measurement target via the fixing member. Accordingly, the strain sensor does not generate an output signal when no external force is applied, demonstrating stable characteristics.

U.S. Pat. No. 7,293,466, issued Nov. 13, 2007 to Ohta, et al., discloses a bolt with a function of measuring strain, comprising a Wheatstone bridge circuit comprising a strain sensor and a dummy resistor, a translate circuit that amplifies a signal from the Wheatstone bridge circuit to convert the same into a digital signal, a transmitting circuit that transmits the digital signal outside the bolt, and a power circuit, by which electromagnetic wave energy received from outside the bolt is supplied as a power source for at least any one of the circuits.

U.S. Pat. No. 6,658,924, issued Dec. 9, 2003 too Shirato, et al., discloses a method for measuring dynamic characteristics of a wheel of a vehicle. A washer-type strain sensor, which generates an output representing a load acting thereon, is arranged between the vehicle body and the wheel. A dynamic load acting on the wheel is measured on the basis of the outputs of the strain sensor when the vehicle is traveling. A lateral force, a lateral-force coefficient, a slip angle, and steering characteristics of the wheel are obtained on the basis of the measured dynamic load, and thereby the cornering characteristics of the wheel are obtained.

U.S. Pat. No. 6,575,039, issued Jun. 10, 2003 to Murai, et al., discloses a combustion pressure sensor assembly. A glow plug with combustion pressure sensor having a plug body having a screw portion on the outer peripheral surface is inserted into a screw hole of an engine head and screw-connected to it, a combustion pressure sensor fixed to the plug body to which the plug body is inserted, and a lead wire for leading out the sensor signal connected to the sensor, wherein the outside diameter of a hexagonal portion used for screw connection between the plug body and the screw hole out of the plug body is smaller than the inside diameter of a through hole of the combustion pressure sensor so that the plug body can be inserted into the combustion pressure sensor from the hexagonal portion end.

U.S. Pat. No. 5,970,798, issued Oct. 26, 1999, Gleman, et al., discloses an ultrasonic bolt gage which uses a cross-correlation algorithm to determine a tension applied to a fastener, such as a bolt. The cross-correlation analysis is preferably performed using a processor operating on a series of captured ultrasonic echo waveforms. The ultrasonic bolt gage is further described as using the captured ultrasonic echo waveforms to perform additional modes of analysis, such as feature recognition. Multiple tension data outputs, therefore, can be obtained from a single data acquisition for increased measurement reliability. In addition, one embodiment of the gage has been described as multi-channel, having a multiplexer for performing a tension analysis on one of a plurality of bolts.

U.S. Pat. No. 5,675,087, issued Oct. 17, 1997 to MacLaughln, et al., discloses a device for measuring a load on a part and for monitoring the integrity of the part such as a bolt, comprises a socket having walls defining an interior space wherein the socket engages the bolt for transmitting a load to the bolt. An electromagnetic acoustic transducer comprising a magnet and a coil is located in the interior space of the socket near the bolt. The coil provides a current while the magnet provides a magnetic field such that the magnet and the coil generate an ultrasonic signal within the bolt. A detector is used to detect and measure a change in the ultrasonic signal at the bolt for measuring the load on the bolt and for detecting any flaws in the bolt.

U.S. Pat. No. 5,499,540, issued Mar. 19, 1996 to Whaley, et al., discloses a device for measuring a load on a part such as a bolt, comprises a socket having walls defining an interior space wherein the socket engages the bolt for transmitting a load to the bolt. An electromagnetic acoustic transducer comprising a magnet and a coil is located in the interior space of the socket near the bolt. The coil provides a current while the magnet provides a magnetic field such that the magnet and the coil generate an ultrasonic signal within the bolt. A detector is used to detect and measure a change in the ultrasonic signal at the bolt.

U.S. Pat. No. 5,437,525, issued Aug. 1, 1995 to Bras discloses a force sensor for measuring tightening tension applied to an assembly component having first and second faces and an axis of symmetry includes a ceramic support layer having a mounting side to be secured to the first face and an exposed side carrying a piezoresistive layer having a resistance that varies in response to its deformation. The force sensor may comprise a central metallic layer and an annular metallic layer joined by the piezoresistive layer or at least two separate sensors having angularly disposed longitudinal axes. A machine for tightening the assembly component includes a motor driven socket for torqueing the component in accordance with a sensed tightening tension.

U.S. Pat. No. 5,392,654, issued Feb. 28, 1996 to Boyle discloses a rock bolt load sensor assembly for use to determine the load on a nut screwed onto a bolt embedded in a rock face, the assembly comprising a plurality of spring washers arranged to be mounted on the bolt between the nut and a roof plate, and a sensor comprising an induction coil adapted to be, in use, placed around the washers, the sensor including an indicator coupled to the induction coil whereby in use, the spring washers define an air space which varies in dependence on the load on the bolt and the induction coil provides an electrical indication of variation of the air space and the indicator provides an indication of variation of the load on the bolt.

U.S. Pat. No. 5,343,759, issued Sep. 6, 1994 to Hesthamar et al., discloses a sensor system for measuring e.g. the preloads in screws, bolts or similar. It comprises sensor means comprising a magnetoelastic material sensitive to the preloads to which the object is exposed and a sensing device comprising a contact portion and gripping portion. The contact portion is so arranged that it at least partly surrounds the sensor means and the magnetoelastic material is excited with an excitation frequency of at least 300 kHz.

U.S. Pat. No. 5,323,643, issued Jun. 28, 1994 to Kojima, et al., discloses a device for detecting a change in internal pressure of a cylinder includes a cylinder head, an ignition plug threadingly fitted into a plug insertion hole of the cylinder head. An annular piezoelectric sensor is secured in the plug insertion hole by screwing the plug into the insertion hole. The sensor has such an outer periphery that, when the ignition plug is screwed into the plug hole, a part of the outer periphery of the sensor placed is brought into engagement with an inside periphery of the plug hole and is thereby prevented from being further rotated in the screwing direction. By using a gasket having the same relative shape to the periphery of the plug insertion hole as that of the above sensor, rotation of the sensor can be prevented even when the sensor does not have such a relative shape.

U.S. Pat. No. 4,760,740, issued Aug. 2, 1988 to Mesiterling discloses a vacuum coupled ultrasonic transducer is presented for coupling a transducer to a bolt for ultrasonic measurement of bolt elongation. A central passageway extends through the transducer body, the piezoelectric crystal and a seal element. A vacuum line extends through the central passageway.

U.S. Pat. No. 4,553,124, issued Nov. 12, 1985 to Malicki discloses a strain gauge transducer which is utilized with a bolt to sense loading and has a construction which permits accurate axial alignment, testing before installation, removal for inspection and any necessary repair. The transducer includes a body having a web extending between a threaded inner end and an enlarged outer head. An annular seat on the head engages a bolt hole surface as the threaded inner end is received by a threaded portion of the bolt hole. At least two strain gauges are utilized with each mounted on one of the parallel web surfaces, and wires connected to the strain gauges extend through a wire passage in the enlarged head to permit a signal to be sensed by the strain gauges and fed to suitable instrumentation. In the preferred construction, the web has a thickness in the range of about 0.020 to 0.060 of an inch and most preferably, about 0.040 of an inch in order to minimize twisting of the web upon installation while still providing accurate readings that are not substantially affected by bending loading. Round inner and outer portions provide uniform loading of the web without any stress concentrations.

U.S. Pat. No. 4,295,377, issued Oct. 20, 1981 to Couchman discloses a threaded fastener incorporating a removable ultrasonic transducer for obtaining preload measurements as well as other measurements for quality control inspection or for monitoring purposes. The transducer may be removed for repair or replacement purposes.

U.S. Pat. No. 4,062,227, issued Dec. 13, 1977 to Heyman discloses a CW ultrasonic device for measuring frequency shifts of the peak of a mechanical resonance in a body. One application of the device is measuring the strain in a bolt. It also has other applications such as measuring the thickness of a body, measuring the depth of a flaw in a body, measuring the elongation of body and measuring changes in velocity of sound in a body. The body is connected, by means of a CW transducer, to electrical circuit means including a narrow band RF amplifier to form a closed loop feedback marginal oscillator that frequency locks the device to the peak of a mechanical resonance in the body. Thereafter, when the frequency of this peak changes, because of a physical change in the body, the frequency of the oscillator changes. The device includes an automatic frequency resonant peak tracker that produces a voltage that is related to a change in frequency of the oscillator. This voltage is applied to the RF amplifier to change the center of its frequency band to include the frequency of the peak and is a measure of the frequency shift. The device also includes a special transducer which requires contact to only one side of the body and provides high electrical isolation between its parts.

Japanese Patent No. 11-118637 issued Oct. 15, 2007 to Yoshihiri discloses a sensor bolt. To the bottom part of a through hole formed from the side of the head part of a sensor bolt, a sensor such as a distortion gage is mold-adhered. In addition, the output of an amplifier housed in the recessed part of the head part is connected to an indicator such as an LED. The sensor bolt is inserted into the hole of a body to which a bolt is tightened and is tightened with a nut, and the sensor detects a generated tightening axial force and outputs an electric signal. The amplifier amplifies and compares it with an optimum set tightening value set in advance. In other words, as the electric signal is smaller than the optimum set value at the beginning of tightening, the indicator is lighted, and at the time when the electric signal reaches the optimum set value with the gradual tightening, the indicator is turned off. In the case that the tightening is excessive above the optimum set value, the indicator is lighted.

Japanese Patent Application No. JP2005114441 published Oct. 6, 2003 to Hiroyuki, et al., discloses an electric circuit driven by the power supplied by any one of electromagnetic coupling, electromagnetic induction, microwave power dispatching, and optical coupling. A Wheatstone bridge constituted in the impurity dispersion layer of a silicon substrate is embedded in the bolt. The power supply system without wiring makes it simple and long life. A dummy resistor for constituting the Wheatstone bridge is embedded in the bolt, thereby the high precision measurement can be performed even in the case that the temperature is changed.

Japanese Patent Application No. JP2002004798 published Jun. 22, 2000 to Akira, et al., discloses a fastening and strain sensing system using a fastening body. A strain sensing system comprises a bolt, a nut, and a spacer installed between the nut and a body to be fastened and a transponder which uses a fastening body capable of sensing a strain which occurs in the axial direction of the bolt.

United States Patent Application No. 20130068031 filed Mar. 21, 2013 to Mekid, et al., discloses a bolt tension monitoring system that provides remote monitoring of the tension of a bolt, thus allowing for remote monitoring of general structural health and integrity of the fastener. The bolt tension monitoring system includes a housing adapted for being retained on a head of a bolt to be monitored. The system further includes a force transducer positioned between the head of the bolt and a surface in which the bolt is fastened and measures tension between the head of the bolt and the workpiece surface. A controller circuit within the housing calculates the difference between currently measured tension between the head of the bolt and the workpiece surface and an initially measured tension. A wireless transponder mounted in the housing transmits an alert signal if the calculated difference exceeds a pre-defined threshold value.

United States Patent Application No. 20100054891 filed Mar. 4, 2010 to Nishida, et al., discloses a detecting system of a fastening apparatus that detects an axial force of the fastening apparatus including a bolt or a nut. The detecting system includes an axial force detector including a strain gauge and an IC tag, the strain gauge being provided at a predetermined location to detect an axial force value of the fastening apparatus, and the IC tag being connected to the strain gauge and wirelessly transmitting the detected axial force value and unique identification information. Power is supplied to the axial force detector. A reader reads data transmitted from the axial force detector.

United States Patent Application No. 20100261578 filed Oct. 14, 2010 to Fujii, et al., discloses a load sensor assembly for measuring an amount of torque transmitted through a torque establishing element that includes a core mounted on a transmission housing and a load sensor mounted on the core. The load sensor is positioned against a portion of the torque establishing element whereby a portion of the amount of torque transmitted through the torque establishing element travels through the load sensor and is measured. A cable is connected to the load sensor for transmitting a signal representative of the amount of torque to a transmission controller.

United States Patent Application No. 20080278319 filed Nov. 13, 2008 to Meiksin, et al., discloses a detection and alarm system comprising a piezoelectric film sensor and associated circuitry. The sensor detects acoustic emission signals from metallic objects under stress upon which it is affixed. The associated circuitry receives electronic signals from the sensor, creates and evaluates a sensor output value including rate ratio and frequency content of such signals within preset time limits. This data allows the detection of impending failure, an alarm condition, of the metallic object by identifying significant changes in the rate of emission of such sensor signals. An alarm condition may then trigger an alarm signal to warn of such impending failure.

As seen from above, the prior art does not teach how to provide a low cost torque monitoring system using strictly or pseudo passive wireless tags that operates with standard off the shelf or unmodified fasteners. Moreover, even the above discussed art that utilize RFIDs require relatively expensive modified bolts that have a very limited range of transmission so that the fastener torque sensing systems are not only expensive but have significantly limited functionality. Accordingly, those of skill in the art will appreciate the present invention that addresses the above and other problems.

SUMMARY OF THE INVENTION

Accordingly, it is an object of the present invention to provide an improved RFID torque-sensing tag system for fasteners.

Another object of the present invention is to provide an RFID torque-sensing tag system for fasteners that operates with standard off-the-shelf fasteners.

An additional object of the present invention is to provide a RFID torque-sensing tag system for fasteners that provides for remote reading which eliminates manual checking of each fastener.

Yet another possible object of the invention is to provide RFID torque-sensing tag system for fasteners that provides highly reliable data and cost effective means to observe operational status of equipment and other systems.

A further object of the present invention is to provide a RFID torque-sensing tag system for fasteners that improves safety by reducing quality control labor and providing a cost effective means to detect loose fasteners to prevent injury to people and damage to critical equipment.

In accordance with the disclosure, the present invention provides a wireless tag system configured to detect tension of at least one fastener in response to an interrogation signal from a wireless interrogator, in one possible embodiment comprising at least one wireless tag operable to transmit a tension indication signal indicating an amount of tension applied to the fastener in response to the interrogation signal from the wireless interrogator, and a resilient member being responsive to the amount of tension applied to the fastener for movement between at least a first configuration and a second configuration. In the first configuration, the resilient member is configured to indicate a first tension applied to the fastener. In a second configuration, the resilient member is configured to indicate a second tension applied to the fastener. The wireless tag is responsive to the resilient member for transmitting the tension indication signal in at least one of the first configuration or the second configuration.

In another embodiment, the wireless tag may be positioned to comprise an offset between the wireless tag and the resilient member in the first configuration. In the second configuration, the resilient member may be compressed into an engagement position with the wireless tag.

In yet another embodiment, the wireless tag may be configured to transmit the tension indication signal in response to the interrogation signal from the wireless interrogator only when the resilient member is in one of the first configuration or the second configuration.

In yet another embodiment, the wireless tag may further comprise a first circuit operable to produce the tension indication signal and a supplemental circuit operable to produce a second wireless signal comprising identification information in response to the wireless interrogation signal when the wireless tag does not transmit the tension indication signal.

In one possible embodiment, the wireless tag may further comprise a first circuit operable to produce the tension indication signal, the wireless tag further comprising a supplemental circuit operable to produce a second wireless signal with identification information in response to the wireless interrogation signal when the fastener is in the first configuration and/or the second configuration.

In one embodiment, the resilient member may comprise part of an antenna. The antenna is configured to transmit the tension indication signal. The wireless tag may further be configured to exclusively utilize power of the wireless interrogation signal to provide power for the wireless tag to wirelessly transmit the tension indication signal.

In another embodiment, when the resilient member is compressed to the second configuration, then the tension member may be tensioned to a predetermined minimum tension.

Another embodiment may further comprise visual indicia associated with a plurality of fasteners and programming for the interrogator and/or a computer to indicate which of the plurality of fasteners requires additional tensioning.

In another embodiment of the present invention, the wireless tag is responsive to an amount of tension applied to the fastener for placing the wireless tag into a plurality of states comprising at least a first state or a second state. In the first state, the wireless tag does not wirelessly transmit the tension indication signal in response to the interrogation signal from the wireless interrogator. In the second state, the wireless tag is configured to wirelessly transmit the tension indication signal in response to the interrogation signal from the wireless interrogator.

In one embodiment, the wireless tag may be configured to exclusively utilize power of the wireless interrogation signal to provide power for the wireless tag to wirelessly transmit the tension indication signal. The wireless tag may further be configured to be responsive to the fastener being placed under a minimum predetermined tension whereby the wireless tag is then placed into the second state.

In another embodiment, the wireless tag may comprise electrical contacts which engage the resilient member when the resilient member is in the second configuration. The wireless tag may further comprise an opening for receiving the fastener.

Another embodiment may comprise a plurality of wireless tags for monitoring tension of a plurality of fasteners. The tension indication signal produced by each of the plurality of wireless tags further comprises information to identify each of the plurality of fasteners.

The present disclosure also provides for a wireless tag method to monitor tension of a fastener in response to a wireless interrogation signal from a wireless interrogator. The method comprises steps that may comprise steps such as providing a tension member for at least one wireless tag, providing that the tension member is responsive to a tension applied to fastener, configuring the wireless tag to respond to the wireless interrogation signal with a wireless tension indication signal indicative of tension applied to the fastener at least when tension applied to the fastener reaches a predetermined tension, and utilizing only power of the interrogation signal to power the wireless tag.

Other steps may include positioning the wireless interrogator at a position greater than three feet from the fastener and producing the wireless interrogation signal.

In one embodiment, the method may further comprise configuring the wireless tag to respond to the wireless interrogation signal with a wireless tension indication signal indicative of tension applied to the fastener only when tension applied to the fastener reaches a predetermined tension.

Further steps may include providing that the tension member comprises a resilient member, positioning the resilient member adjacent to the fastener to compress the resilient member in response to tension applied to the fastener, and utilizing the resilient member as part of an antenna for the wireless tag.

The disclosure may further provide for a wireless tag system configured to detect tension of at least one fastener in response to an interrogation signal from a wireless interrogator, comprising at least one wireless tag operable to transmit a tension indication signal indicating tension applied to the fastener in response to the interrogation signal from the wireless interrogator and a resilient member positioned for compression in response to tension applied to fastener. In this embodiment, the resilient member comprises at least part of an antenna.

In another embodiment, a wireless tag system is configured to detect tension of a fastener. The system comprises a wireless tag, an interrogator operable to send a wireless interrogation signal to the wireless tag and to receive a wireless tension indication signal from the wireless tag in response to the wireless interrogation signal. The tension indication signal comprises information about an amount of tension applied to the fastener. An interface for the wireless tag is responsive to the amount of tension applied to the fastener for placing the wireless tag into either an off state or an on state, whereby in the off state the wireless tag does not wirelessly transmit the tension indication signal and in the on state the wireless tag is configured to wirelessly transmit the tension indication signal.

In one possible embodiment, the resilient member completes a circuit when the resilient member is in the sufficiently compressed configuration. In another embodiment, the resilient member may comprise a spring washer.

The system may further comprise a plurality of the wireless tags, the fastener comprising a plurality of fasteners, the plurality of wireless tags are associated with respective of the plurality of fasteners, the tension indication signal produced by each of the plurality of wireless tags further comprising information to identify each of the plurality of fasteners.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE INVENTION

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner. It will be understood that the components can sometimes be shown herein in substantially conceptual form for ease of understanding. The illustrations are not intended to represent manufacturing level drawings with manufacturing level dimension precision, sizes, or details.

Figure 1:
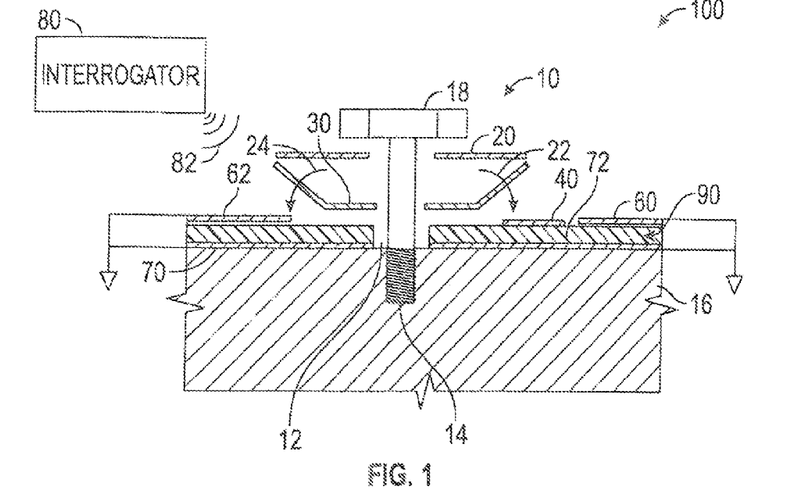
FIG. 1 is a side view diagram of a RFID torque sensing tag system for fasteners with a spring washer that can be compressed to a desired tension whereupon the RFID device will responsively transmit a signal indicating satisfactory tensioning in accord with one possible embodiment of the present invention.

Referring now to the drawings and, more specifically to FIG. 1, there is shown for illustrational purposes an elevational cross-sectional diagrammatic view of one possible embodiment of RFID torque sensing tag system 100. RFID tag 10 (sometimes referred to as a sensor by those of skill in the art) comprises a circuit board with ground metallization layer (or ground plane) 70, insulating substrate 72, and surface metallization layers 60, 62. Surface metallization areas 60, 62 are used in conjunction with and connected (i.e., shorted) to the ground metallization layer 70 to form corresponding patch antenna surfaces for sending and receiving signals from RFID tag 10.

Figure 2A:
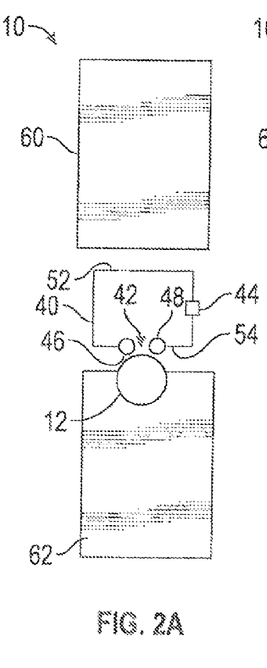
FIG. 2A is a top view diagram of a RFID torque sensing tag system for fasteners with a bolt, spring washer, and washer removed to show a gap in an RFID circuit ring in accord with one possible embodiment of the present invention.

A top view of RFID tag 10, as shown in FIG. 2A, conceptually shows antenna, (which is formed from the assembly of surface metallization areas 60,62, both shorted to the ground plane 70 at the respective distal ends and the intervening insulating substrate layer 72) and RFID ring 40. RFID integrated circuit 44 is in series with RFID ring 40. RFID integrated circuit 44 may be a standard EPC Global Class 1, Gen 2 design that is commercially available and routinely used for asset tracking and supply chain logistics by large organizations such as the Department of Defense and Wal-Mart. However, other types of RFID integrated circuits, e.g., standing wave acoustic SAW devices, could conceivably also be utilized. Circuit boards preformed for particular applications could be utilized. The inventors believe that due to the relatively low cost of detection of fastener errors utilizing the present invention that sensitive systems should require use of the present invention and that suitable regulations should be adopted to reduce the likelihood of disasters.

Referring again to FIG. 1, bolt 18 is shown extending through opening 12 of circuit board 90 that is aligned with tapped hole 14 within base 16. Base 16 represents a structure that requires the use of fasteners and could represent any suitable structure not limited to but including those structures discussed in the BACKGROUND OF THE INVENTION section of this application.

In the view of FIG. 1, spring washer 30 is not compressed (see also FIG. 6) and therefore does not make contact with surface metallization area (or also referred to as antenna circuit layer) 60 or RFID ring circuit 40. The electrical result of the uncompressed configuration of FIG. 1 is effectively the same as the result of the status of RFID tag 10 in FIG. 2A, where RFID circuit 40 is disabled due to open space 42 between electrical contacts 46 and 48. In other words, the ends of spring washer 30 are offset from circuit board 40 prior to compression or if the tension subsequently loses tension to thereby provide a first level of tension information, e.g. absence of sufficient fastener tension. Accordingly, without a completed or series electrical connection in the example of RFID ring circuit 40, RFID tag 10 does not respond to interrogation signal 82 from interrogator or reader 80. Once spring washer 30 is compressed (See FIG. 7) as indicated by arrows 22, 24 the offset is eliminated and spring washer provides a second level of tension information, e.g., sufficient fastener tension.

Interrogator or reader 80 may comprise a standard interrogator or reader used with RFID tags. Interrogator or reader may comprise software 89 (See FIG. 11) in accord with the present system to locate poorly torqued fasteners. Interrogation signal 82 can be utilized in one embodiment to power RFID circuit 40 and therefore may be designed to transmit suitable levels of power to the RFID ring circuit 40. Accordingly, interrogation signal 82 of interrogator 80 can be selected to provide adequate power to RFID circuit 40, when the embodiment utilizes strictly or pseudo passive RFIDS to eliminate the need for a separate power supply. Integrated circuit 44 may be configured to store energy in capacitors for use by programming and signal transmission function of integrated circuit 44.

As discussed herein spring washer 30 may be referred to as resilient member 30 or spring member 30 herein because many types of springs, spring devices, resilient devices, resilient switches, tension responsive members and/or resiliently moveable components and the like could be utilized to enable or disable or otherwise program operation of RFID ring circuit 40. The present disclosure includes a non-exhaustive and non-limiting sample of a few possibilities and is not limited to any particular structure that effectively provides information regarding tension in fastener 18.

Referring to FIG. 1, once spring washer 30 is compressed as indicated by arrows 22 and 24 so that spring washer 30 makes contact with RFID circuit 40 to electrically close gap 42, then RFID circuit 40 is enabled or operational and responds to interrogation signal 82. Accordingly, RFID tag 10 may be used to provide a signal, which may be referred to herein as a tension indication signal 84 (see FIG. 7) when fastener 18 is sufficiently tensioned after initial tightening. In the embodiment of FIG. 1, if fastener 18 becomes loose or otherwise becomes insufficiently tensioned over time, then RFID circuit no longer transmits tension indication signal 84, the absence of which indicates to the user an insufficient tensioned fastener. Accordingly, in one embodiment, the user is notified whether the fastener is suitably tensioned or not.

In FIG. 1, spring washer 30 is a conical spring washer. However the invention is not limited to particular spring washers. Other types of spring washers may also be utilized as discussed hereinafter. Moreover, as discussed hereinafter, the invention is not limited to spring washers but could utilize spring members, resilient members of many types, only some of which are discussed herein.

In the non-limiting example of FIG. 1, RFID tag 10 utilizes flat washer 20 placed on the stem of bolt 18 to compress spring washer 30 as indicated by arrows 22 and 24 for electrically engaging contacts 46 and 48 and thereby electrically closing gap 42 at the frequency of operation. Flat washer 20 is utilized to more evenly compress spring washer 30 where the diameter of the fastener is not sufficiently large to reliably compress spring washer 30.

Depending on the frequency of operation, spacing, and other factors, contacts 46 and 48 may or may not be shorted together to direct current when spring washer 30 is compressed but do at least operate as being electrically connected for the frequency of operation. Accordingly, spring washer 30 acts as an electrical switch that requires a predetermined force or tension to be compressed to close the switch and contacts 46 and 48 due to torque applied to fastener or bolt 18.

In this embodiment, RFID ring 40 is positioned with circuit board hole 12 in surrounding relationship with tapped hole 14 in mounting material 16. In this embodiment, when spring washer 30 is compressed, spring washer 30 is also electrically connected with surface metallization area 60 at operating frequencies. In this embodiment, surface metallization layer (aka antenna circuit layer) 60 lies on top of insulating substrate 72, which partially separates the metalized antenna circuit layer 60 from ground metallization layer 70 by insulating material 72. The insulating material 72 partially separates the antenna circuit layer 60 from the ground metallization layer 70 because both these layers 60, 70 are electrically connected at a distal end.

FIG. 2A shows a top view diagram of RFID torque sensing tag 10 without spring washer 30, bolt 18 and flat washer 20 shown in FIG. 1. As discussed above, RFID ring 40 has gap 42 placed adjacent to opening 12 in the circuit board. In this example, RFID ring 40 is rectangular. The ring 40 electromagnetically couples to the antenna, which is formed from surface metallization layers 60 and 62, ground metallization layer 70, and the insulating material 72 at the predetermined frequency of operation wherein the surface metallization layers 60,62 are electrically connected or shorted to the ground metallization layer 70 at their respective distal ends (as illustrated in FIG. 1 by the non-solid, outlined arrow heads located at each distal end of tag system 100). Upper and lower leads 52 and 54 may or may not be physically connected to surface metallization layers 60 and 62 in the sense of a DC current electrical connection.

RFID ring 40 and the surrounding surface metallization layers 60 and 62 can be configured in many different ways. While RFID ring 40 is rectangular in this application, RFID ring 40 and the corresponding interface with the antenna can be rounded or otherwise shaped. The antenna can surround RFID ring 40 rather than simply being above and below the circuit as shown in FIG. 2A. In this embodiment, gap 42 is positioned adjacent surface metallization layer 62, which has the significant advantage that spring washer 30 actually becomes part of the antenna when compressed thereby improving antenna operation. However if desired, gap 42 could be offset to the side of RFID ring 40 to accommodate fastener spacing placing the switch function of spring washer 30 to another position in RFID ring 40. Accordingly, other configurations for RFID ring 40 with RFID integrated circuit 44 and surface metallization layers 60, 62 can be utilized with other wiring layouts, connections, and so forth to operate in accord with the operating principles discussed herein.

In a presently preferred embodiment, the sufficient or insufficient compression or tensioning of the bolt 18 as determined by the spring tension of spring washer 30 being compressed close gap 42 is used to turn the RFID circuit "on" and "off", respectively, as discussed herein. Collectively, antenna (discussed above), RFID ring 40, and spring washer 30 comprise a RFID (or sensor) tag 10 that can be interrogated by remote reader (or interrogator) 80 to determine whether bolt 18 has been initially adequately torqued and/or whether bolt 18 has loosened after having been adequately torqued.

Prior to tightening or torqueing to the proper tension or pressure, spring washer 30 bends away from contacts 46 and 48 thereby placing RFID tag 10 in a disabled or "off" state, as shown in FIG. 1 and FIG. 2A. In the "off" state, spring washer 30 is not compressed and hence does not provide a sufficiently conductive path to close gap 42 of RFID ring 40 such as by physically electrically connecting contacts 46 and 48 together.

Figure 2B:
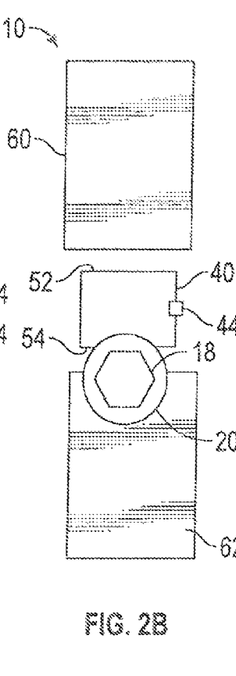
FIG. 2B is a top view diagram of a RFID torque sensing tag system for fasteners with the bolt and suitable hardware installed to cover the gap in the RFID ring of FIG. 2A in accord with one possible embodiment of the present invention.

In FIG. 2B, bolt 18 has been compressed so that spring washer 30 is flattened to the point that gap 42 of RFID ring 40 is electrically closed. RFID ring 40 is now in an "on" or activated state. In the activated state, RFID ring 40 is able to couple to adjacent surface metallization layers 60, 62 so that RFID integrated circuit 44 can be energized by the signal from the remote reader. In one embodiment spring washer 30 is used with only bolt 18 to engage spring washer 30. However, flat washer 20 and/or other washers, lock washers, and the like, may be used when the bolt bead diameter is not sufficiently large to compress spring washer 30 as depicted in FIG. 1.

In a preferred embodiment, RFID torque sensing tag 10 is a passive device meaning that even when RFID ring 40 is complete, a wireless RF transmission occurs only when RFID ring 40 is activated by an external reader or interrogator 80. In the presently preferred embodiment, all power for operation of RFID tag 10 is derived from reader (interrogator) 80 or interrogation signal 82. However, if desired, alternative embodiments may comprise active RFID chips with a power source to power chip 44. The design can be tailored to the environment in which the fastener will be used; for example, the distance from which the signal must be read impacts antenna design. The environment can impact characteristics of spring washer 30, which governs the amount of torque needed for operation.

Two characteristics of spring washer 30 that can be of importance include the elasticity and resiliency of spring washer 30, which affect the required tension and the ability for repetitive use of RFID tag 10. In one embodiment, the spring washer can be selected to provide that a desired tension must be applied before the fastener has sufficient tension to compress the spring washer. Accordingly, the present invention can be used to select a desired tension for each fastener. Different spring washers could be utilized with different fasteners if desired to utilize different tension for different fasteners. However, at a minimum, in one presently preferred embodiment, the spring washer can be selected to be resilient so that loosening of the fastener results in the spring washer bending upwardly to break the electrical contact at gap 42, thereby providing an indication that the fastener is no longer sufficiently tightened. In other words, for applications where continuous monitoring is desired and any repetitive tightening and loosening of fastener 10 is desired to monitored, then spring washer 30 should at least be resilient.

RFID readers, such as interrogator 80, are capable of reading tags at a very high rate. Line-of-sight is not a necessary requirement. Therefore, a reader in an appropriate environment, for example in a development facility, could have sufficient visibility to read all or most tags associated with structure fasteners in a matter of seconds. Tags not read could warrant inspection, as this could be due to an insufficiently secured bolt, faulty hardware, or signal blockage. If any RFID tag 10 does not produce a signal, then interrogator 80 may be programmed to indicate which RFID tag 10, due to the absence of any received signal and which fastener 18 is not sufficiently tightened. Interrogator 80 may be programmed to provide an indication on the display of the interrogator which fastener(s) are not tight and identification indicia may be provided on each RFID tag 10 to allow easier visual identification of the RFID tag 10 and associated fastener as identified by interrogator 80.

Figure 3:
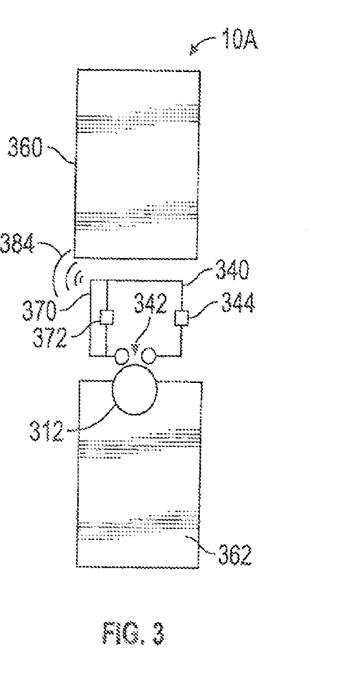
FIG. 3 is top view diagram of an alternative embodiment of a RFID torque sensing tag system for fasteners with a reference RFID ring as well as a tension indication RFID ring and showing the bolt and hardware removed in accord with one possible embodiment of the present invention.

FIG. 3 shows one possible alternative RFID tag 10A with additional reference or supplemental ring 370 having additional integrated circuit 372. RFID tag 10A could employ supplemental or reference RFID ring 370 which is always complete instead of only RFID ring 340 that comprises gap 342 that is only closed by compression of the spring washer. Therefore, RFID tag 10A is always operational. In this way, concerns about whether the interrogator signal strength or the RFID return signal strength is adequate for operation is eliminated. If there is no identification signal 384 signal from RFID tag 10A in response to interrogator signal 82, then it is clear that there is a problem with the signaling.

In this embodiment, RFID ring 340 is operational only when the associated fastener is sufficiently tensioned as discussed herein. Accordingly, reference RFID ring 370 incorporates a second RFID integrated circuit 372 that responds to interrogator signal 82 with identification signal 384 which provides only identification information without information about the status of the tension on each fastener 18. A successful read of reference RFID ring 370 identification code would then determine that RFID interrogation signal 82 has sufficient strength to reach the RFID tag 10A and to power RFID tag 10A for RFID tag 10A to respond with identification signal 384. In this way, issues of whether the circuit is operational to respond to the reader are essentially eliminated. Software employed with interrogator 80 could be utilized to indicate that the RFID tag 10A is operational whenever the interrogation signal is transmitted and to indicate whether or not the associated fastener(s) has been tightened sufficiently or not. In addition, with an interrogator 80 exceptionally close to the RFID tag 10 or 10A, and/or transmitting with a suitably high transmit power, it is possible that RFID integrated circuit 344 responds even when the gap 342 has not been sufficiently closed. In this case, the power reported by IC 372 should show significantly stronger than that reported by IC 344 to indicate that the gap 342 has not been suitably closed. In other words, the difference in power reported by the IC 344 relative to the reference IC 372 may be a more reliable method of determining proper torque to fasten or sustained tension in the bolt.

As discussed herein there are several possible embodiment variations of reference RFID ring 370 and/or RFID ring 340. For example, in one embodiment, RFID ring circuit 340 and/or RFID ring 40 could utilize an integrated circuit 344 or 44 in conjunction with a tension responsive switch connection such as a Wheatstone bridge tension sensor whereby the integrated circuit is programmed to transmit a number of bits, e.g., 10 bits, or $2^{10}$ levels representative of tension information as to whether the fastener is properly tensioned and what the absolute or relative tension is.

In the embodiment of FIG. 3, RFID tag 10A ring 370 will transmit regardless of whether RFID ring 340 is activated or not. In the non-activated mode of RFID ring 340, RFID tag 10A will include identification information produced by RFID ring 370 that may be used to visually identify fasteners that are not sufficiently tensioned assuming software in accord with the present invention is included with reader or interrogator 80, as discussed with respect to FIG. 11.

In yet another embodiment, a single RFID ring could be utilized that always transmits at least an identification signal in response to interrogator signal 82. A switch, such as spring washer 30, provides information to the integrated circuit 44 or 344 whether a particular fastener is tightened/ not tightened that in the simplest form could be represented in with a single bit of data in tension indication signal 84 (See FIG. 7).

In the embodiment of FIG. 3, as with RFID tag 10, once the bolt is inserted into hole 312 in the circuit board and tensioned so that the spring washer provides an electrical connection across gap 342, then RFID ring 340 is turned on, a circuit is established, and a tension indication signal is then transmitted by RFID ring 340 in response to interrogation signal as discussed hereinbefore to indicate the fastener is properly torqued or tensioned. Once activated, RFID ring 340 is able to couple to adjacent antennas 360, 362 so that RFID integrated circuit 344 can be energized by the signal from the remote reader. In which case, absence of a response from reference circuit 340 would indicate a fastener not properly secured. Although shown as a smaller ring, reference ring 370 alternatively could reside beneath the sensing ring with an intervening insulating layer. Further, reference ring 370 could be of a comparable or larger size relative to ring 340.

If desired, the signal from reference RFID ring 370 can be used to help visually identify a faulty fastener by association of the return signal information with visual indicia, numbers, colors, or the like on RFID tag 10A. For example, if RFID ring 340 is open due to gap 342, then integrated circuit 344 will be "off". The receipt of the signal from reference ring 370 may be coupled with information provided by associated software that indicates which fastener is faulty and may provide the user with information to visually identify the faulty fastener.

In yet another embodiment, RFID ring 40 could be made to transmit only when the fastener is not tightened. Thus, prior to tightening the various RFID circuits would respond to provide that the circuits are working but afterward would no longer respond to the interrogator signal. In this embodiment, a reference circuit or programming for integrated circuit (IC) 44 could also be used as discussed above to provide a response signal regardless of whether the fastener is sufficiently tensioned or not.

Figure 11:
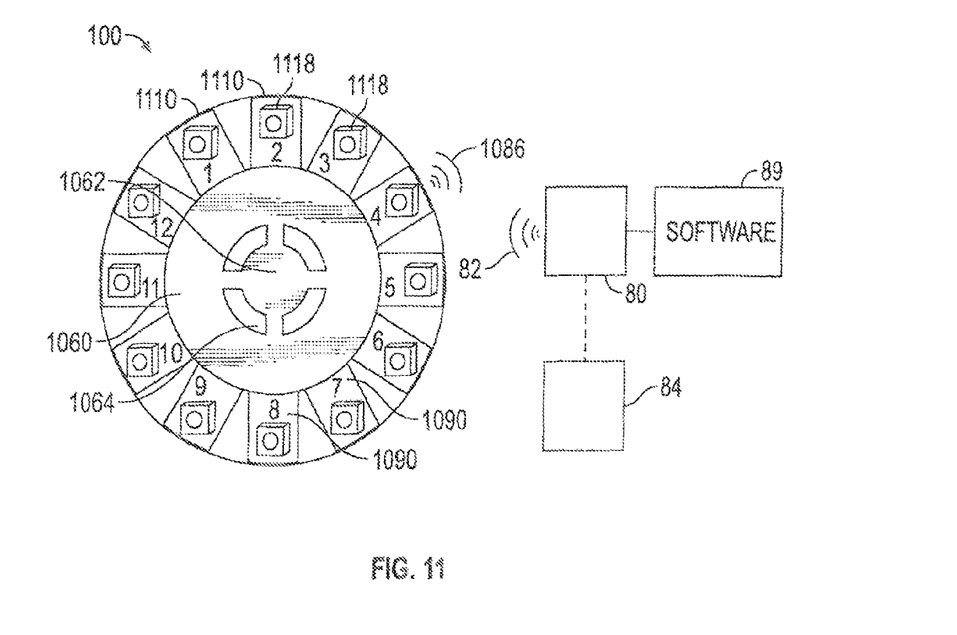
FIG. 11 shows a schematic diagram wherein a torque system for monitoring a plurality of fasteners around a flange is shown in accord with one possible embodiment of the invention.

In yet another embodiment, the circuit board could be made to correspond to a bolt pattern with multiple bolts going through the circuit board (see FIG. 11). In this embodiment, the manufacturer of the flange, bolt pattern, or the like, would design the size of the circuit board for the specific application as part of the manufacturing process, preferably due to regulations requiring tension monitoring of fasteners in critical applications. This could be done to further simplify the monitoring process, make construction of the RFID circuits easier, and maximize circuit operation parameters such as transmission distance (e.g. increase to thirty feet or so). In a variation of this embodiment, either individual fasteners or perhaps groups of bolts or perhaps all bolts would need to be properly tensioned in order for the RFID ring or other series connection to be completed so that at least one RFID integrated circuit would be available to make the transmission signal. Accordingly, the present invention can be modified in many ways in accord with the working principles described herein. FIG. 11 shows a manufactured circuit board designed to fit to a bolt pattern, monitor individual bolts, and utilize a common larger antenna for transmission/receipt of signals.

Figure 4A:
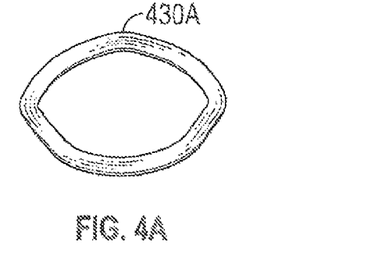
FIG. 4A is a perspective view of a three-wave washer that can be selected to provide a desired tension when compressed for use with a RFID torque sensing tag system for fasteners in accord with one possible embodiment of the invention.
Figure 4B:
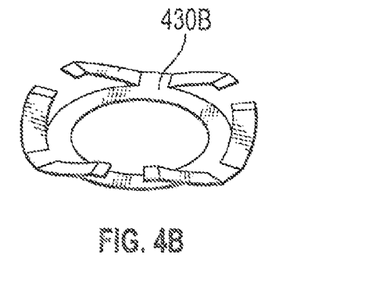
FIG. 4B is a perspective view of a finger spring washer for use with a RFID torque sensing tag system for fasteners in accord with one possible embodiment of the invention.

Many types of commercially available spring washers are suitable for this application. FIG. 1 shows a conical spring washer 30. FIG. 4A shows three-wave spring washer 430A and FIG. 4B shows finger spring washer 430B. Washers 30, 430A, 430B, and numerous other spring washers are offered off-the-shelf with a variety of options that include variations in size, force required to compress, and the number of segments that rise above the resting surface. For example, wave washers are available with various numbers of "waves", and finger spring washers can be found with different numbers of fingers. It will also be appreciated that other springs, spring members of various types, or the like may be utilized to activate RFID tag 10, which may or may not comprise washers.

While a presently preferred embodiment utilizes a spring washer arrangement to effectively provide an on-off switch, a switch, spring-loaded switch, or the like could be placed across gap 42 that would be closed when the fastener is sufficiently tensioned. Accordingly, the present invention is not limited to the use of spring washers but could use any suitable type of switch, mechanism, latch, resilient member or the like that is responsive to the tension applied to the fastener. In one embodiment, the switch or associated hardwire includes a resilient member that will repeatedly open the gap if the fastener becomes too loose, is tightened, and then again becomes too loose over time. However, even in those circumstances of sealed units where it is unlikely that the fastener tension will be checked again subsequent to torqueing of internal fasteners, at a minimum, the switch, washer assembly, or the like, could indicate that the final torque applied is adequate.

Furthermore, many RFID integrated circuits permit storage of user data. Hence, depending on the type of IC, data could be stored directly at the site of the bolt; for example, the last time the bolt tag was read, who last modified the structure configuration, and/or a single bit that indicates whether the fastener is sufficiently tensioned. In yet another embodiment, depending on available power for RFID tag 10, a bridge or other tension measuring device might be momentarily energized in response to each interrogator signal 82 for use of user data across gap 42 or at another desired connection to processor 44 to provide a better estimate of the level of tension that has been applied, as might be useful to track changes in tension over time.

Figure 5A:
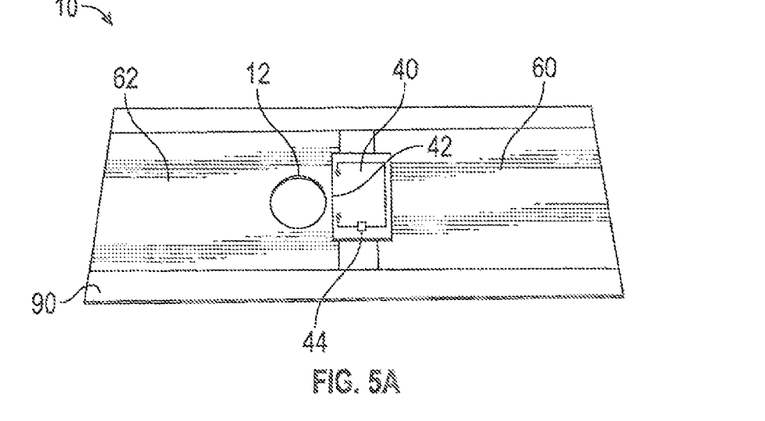
FIG. 5A is a perspective view of a RFID torque sensing tag system for fasteners with the bolt and washers removed in accord with possible one embodiment of the present invention.
Figure 5B:
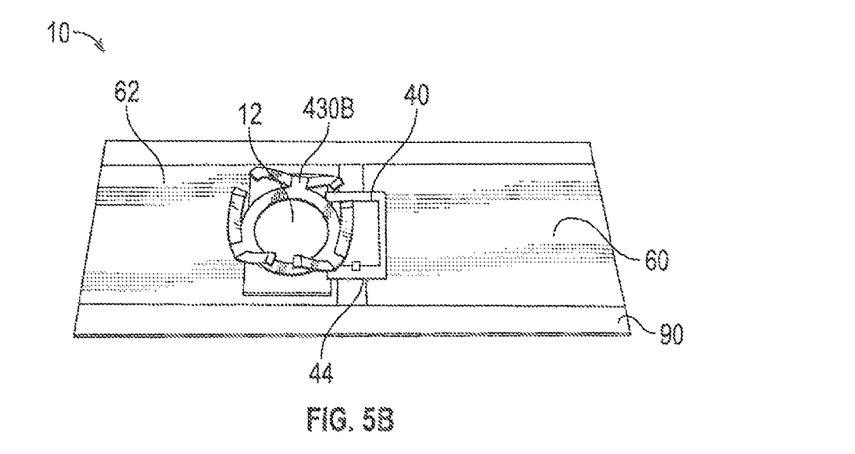
FIG. 5B is a perspective view of a RFID torque sensing tag system for fasteners with a spring washer shown position to be installed in accord with one possible embodiment of the present invention.

FIG. 5A shows one possible embodiment of RFID-based torque sensor 10 for fasteners. RFID ring 40 with integrated circuit can be seen adjacent to opening 12 through circuit board 90 and surface metallization layers 60, 62 placed in electrical communication with RFID ring 40 and RFID integrated circuit 44. In FIG. 5B, a finger type of spring washer 430B has been added to the arrangement during construction. Once a fastener is tensioned, then compressed spring washer 430B completes the circuit operation and further, at least in this embodiment, is utilized as part of the antenna to broadcast an RFID signal.

FIG. 5A shows a side perspective view of prototype RFID tag 10 prior to installation. As shown in FIG. 5B during the mounting process spring finger washer 430B has been positioned around opening 12. A nut, bolt, and/or other fastener is then attached to and torqued, compressed, impacted or otherwise activated to the desired tension. At that moment, spring washer 430B completes the circuit so that subsequently system 100 (as shown in FIG. 1) can be utilized to monitor the tension applied utilizing the compression shape of spring washer. The spring washer generally will have an uncompressed shape that does not contact gap 42 and a compressed shaped that does contact gap 42. If necessary, spring finger washer 430B resides beneath a flat washer, such as flat washer 20 shown in FIG. 6. FIG. 5B shows RFID tag 10 during the mounting process with spring washer 430B installed around opening 12.

Figure 6:
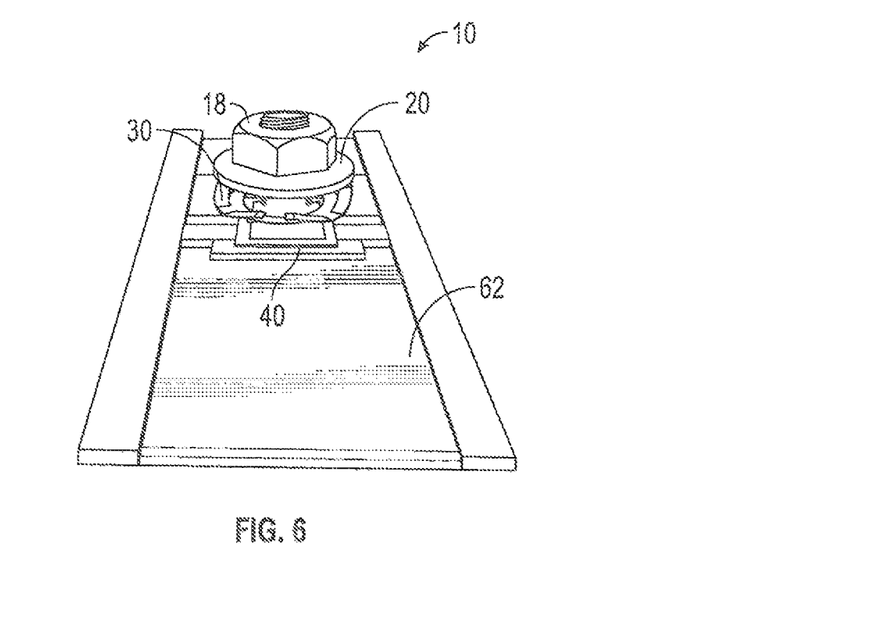
FIG. 6 is a perspective view of a RFID torque sensing tag system for fasteners with the bolt and washers not compressed whereby the RFID transmitter circuit is turned off in accord with one possible embodiment of the invention
Figure 7:
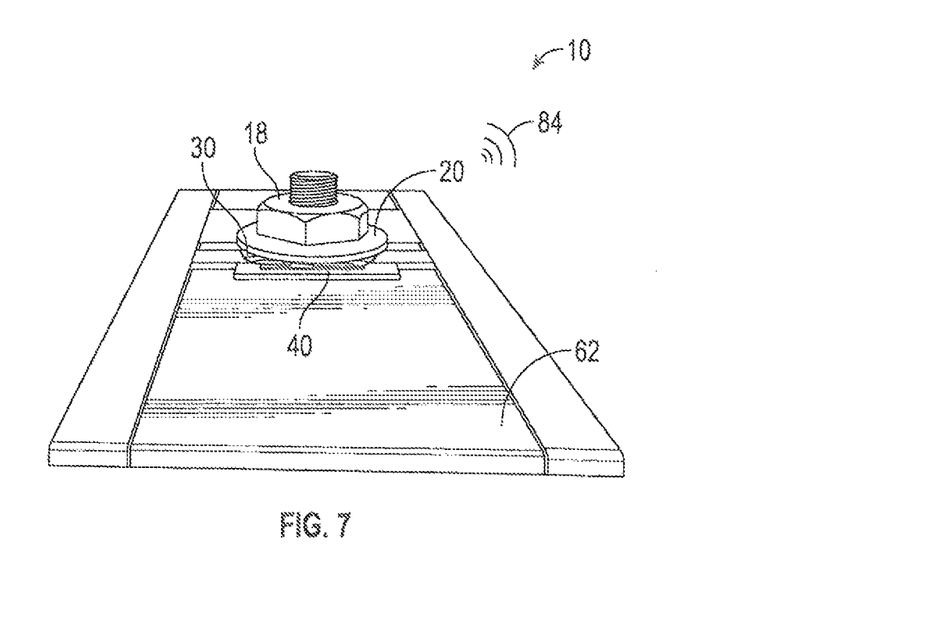
FIG. 7 is a perspective view of a RFID torque sensing tag system for fasteners with the bolt and washers compressed whereby the RFID transmitter circuit is turned on in accord with one possible embodiment of the invention.

FIG. 6 and FIG. 7 show the same RFID tag 10 before and after spring washer 30 has been compressed using a torque wrench. In FIG. 6, spring washer 30 is not compressed and the gap is not covered. However, in FIG. 7 nut 18 has been tightened on the stud to compress flat washer 20 and thereby also compress spring washer 30. Accordingly, in response to interrogator signal 82 from interrogator 80, RFID tag 10 produces tension indication signal 84. It will be noted that the diameter of nut 18 is too small to reliably compress spring washer 30 by use of itself alone. In this case, flat washer 20 can be interposed between spring washer 30 and nut 18 to transfer pressure over a wider zone that reliably compresses spring washer 30. It will also be noted that nut 18 securely fastens the circuit board 90 (FIG. 1) of RFID 10 to the body of whatever structure is utilized, e.g., the flange structure of FIG. 11 or base structure 16 of FIG. 1.

In one example of operation of RFID tag 10, a commercial RFID reader is used to interrogate the sensor tag. If desired, an anechoic chamber can be used for testing purposes to eliminate background noise for more consistent evaluations of the operation of RFID 10.

Figure 8:
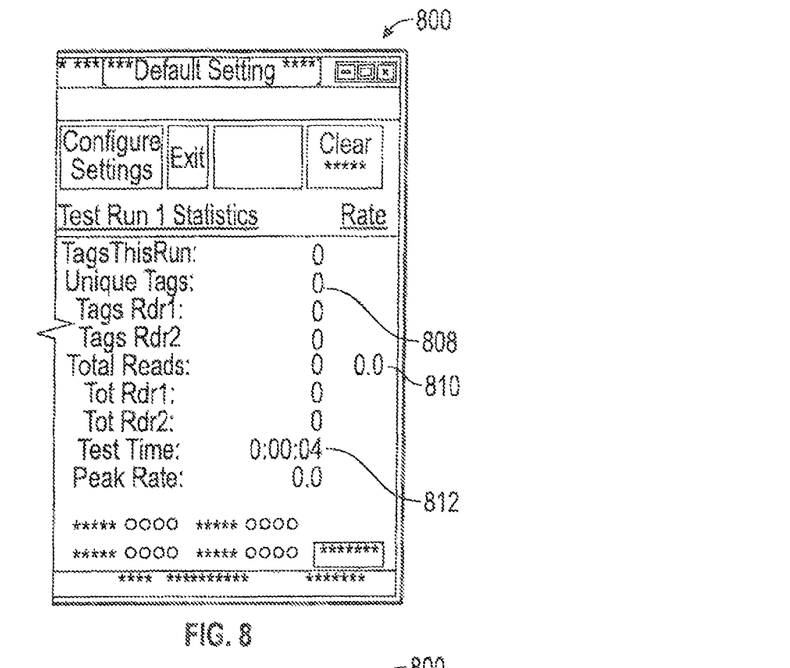
FIG. 8 is an illustration of the user interface for a RFID torque sensing tag system for fasteners with the a bolt unsecured wherein the interrogator is three feet from the corresponding RFID tag in accord with one possible embodiment of the invention.

In a first example shown in FIG. 8, RFID tag 10 is placed in an anechoic chamber at a distance of three feet from the reader antenna. FIG. 8 shows one possible display of many possible displays from graphical user interface 800 of the commercial RFID reader prior to the compression of spring washer 30. However, in a preferred embodiment, refinements in the display software may be utilized to provide formation such as which fastener(s) are torqued to the desired tension, pressure, or the like and which fasteners are not tensioned to the desired tension In the first example, the number of reads is indicated as "0" next to the reference numeral 810, thus properly indicating that RFID ring 40 is in the off or non-activated state and is not transmitting a signal in response to interrogation signal 82 from interrogator 80. Only a single RFID ring circuit is tested in the example. Accordingly, zero unique tags are detected as indicated at 808. The test time is four seconds as indicated at 812.

Figure 9:
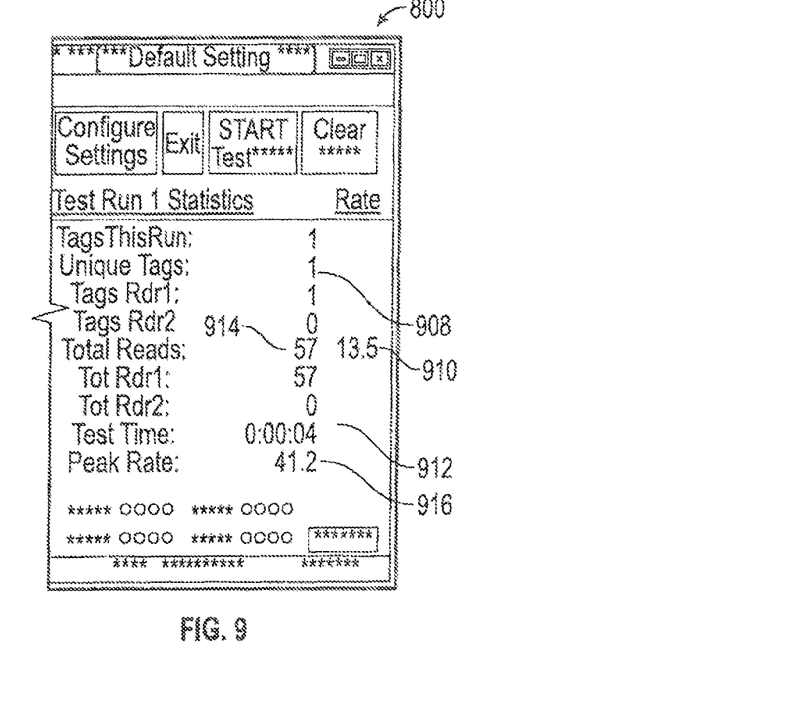
FIG. 9 is an illustration of the user interface for a RFID torque sensing tag system for fasteners with one fastener secured wherein the interrogator is three feet from the RFID tag in accord with one possible embodiment of the invention.

In a second example shown in FIG. 9, spring washer 30 on a single RFID tag 10 is compressed using a wrench, socket drive, torque wrench, or the like, to thereby electrically close gap 42 and utilize spring washer 30 as part of antenna for RFID tag 10. RFID tag 10 acts as a sensor and may sometimes be referred to by those of skill as a sensor. In the second example, RFID tag 10 produces tension information signal 84 (See FIG. 7). At the same distance of three feet, FIG. 9 shows the display user interface 800 from the commercial RFID reader 80 following compression of spring washer 30. In contrast to the display shown in the first example of FIG. 8, it can be seen in the second example that interrogator successfully reads a single unique RFID tag as indicated at 908. The tag is read fifty-seven times as indicated at 914 with a measured average read rate of 13.5 reads/second is indicated at 910. The peak read rate of 41.2 reads/second is shown at 916. The test time is four seconds as indicated at 912. It will be appreciated that the system will provide the number of unique tags read if multiple different fasteners are utilized along with read information for each.

The information transmitted by RFID 10 may comprise numerous bits, e.g., ninety-six bits or other amounts depending on the type of RFID integrated circuit 44. The RFID 10 identification bits may be used by software in interrogator 80 in accord with the present invention to indicate the location of the particular fastener that is not sufficiently tightened. The software may interpret the data from RFID 10 to show a numeral, color, and/or other indicia that allow visual detection of any particular fastener(s) that are compromised. Each RFID tag 10 sends the information for unique identification thereof which can then be utilized for color or numeral interpretation. Each RFID tag 10 may comprise bar code information on the circuit board that can be scanned for use in the software of interrogator 80 to quickly program information to relate RFID tag 10 circuit board 90 identification numbers, indicia, color or other features with the particular RFID tag 10. The numbers, colors, indicia, shapes or the like may be reflective for easier visual detection.

Figure 10:
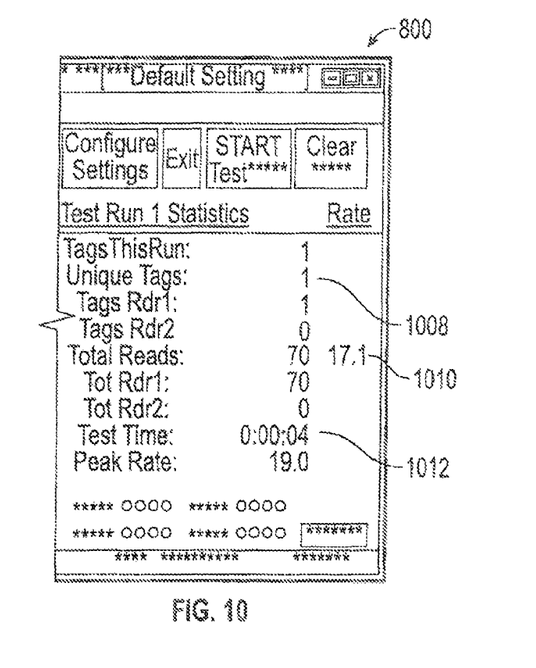
FIG. 10 is an illustration of the user interface for a RFID torque sensing tag system for fasteners with one fastener secured wherein the interrogator is three feet from the RFID tag in accord with one possible embodiment of the invention.

In the third example of FIG. 10, RFID tag 10 is moved a distance of nine feet from the reader antenna. In this example, interrogator 80 user interface 800 detects a single unique RFID tag 10 as indicated at 1008. The interrogator 80 received the tension indication signal 84 from RFID tag 10 seventy times. The test time was four seconds as indicated at 1012. Accordingly, in the third example, it will be noted that an increased distance of ten feet between interrogator 80 and RFID tag 10 as compared with the second example using a distance of three feet between interrogator 80 and RFID tag 80, resulted in an increased the number of reads. This shows that increased distance between interrogator 80 and RFID tag 80 does not necessarily result in poorer performance but can sometimes result in improved performance, which shows the usefulness of testing in anechoic chamber to eliminate background factors as a cause for the change in read rate. In the example, the average read rate in the third example as indicated at 1010 is 17.1 reads/second. The peak read rate is 19.0 reads/second.

FIG. 11 schematically shows RFID tag system 100 with a manufactured circuit board adapted to a particular fastener configuration, namely a flange connection that may be utilized with gussets or the like on bridges or numerous other structures. In this embodiment separate RFID tags may be utilized. However, in another embodiment, a single circuit board with RFID technology, which may be referred to as 1110 and spring members or switches of various types may be adapted to fastener configurations on plates, rivet sections on planes, gussets and plates for tunnels, railroad tie fasteners, expensive structures such as satellites and the like, as part of the manufacturing process itself to better adapt the base structure 16 (See FIG. 1) for maximizing transmission efficiency.

In the case of multiple RFID tag elements, which may comprise a single circuit board, 1110 could be used with a common large antenna 1060 wherein multiple processors associated with each individual fastener could be programmed to transmit at different intervals, frequencies, or the like after receiving interrogation signal 82. In another embodiment multiple resilient switches at each fastener connect to a single integrated circuit programmed to transmit the status of all tensioners during each read using antenna 1060. The larger antenna provides more power to the integrated circuit from interrogator signal 82 for charging operating capacitors in the integrated circuit, with the possibility of greater programming/processing functions of the integrated circuit.

In FIG. 11's schematic illustration, antenna 1060 may be segmented and include director element or separate antenna element 1062, which is separated by insulator regions 1064. Other antenna arrangements such as coils or the like may be utilized to direct the antenna transmission greater distances so that a user would have instructions perhaps included in the programming of interrogator 80 to stand at a certain region or angle with respect to underlying structure 16 (see FIG. 1) for more consistent reading of signals.

Interrogator 80 can be used to send interrogation signal 82, which can provide power for the RFID tags to respond with signals such as signal 1086. The increased power collection of power utilizing a larger antenna could be used to power a more powerful integrated circuit that has data lines that connect to each corresponding switch, spring washer, or the like used with each fastener 1118.

As discussed hereinbefore, computer 84 and/or interrogator 80 may comprise software 89 that provides location information for fasteners that are sufficiently tightened and/or for fasteners that are not sufficiently tightened. For purposes herein, a computer is defined as an electronic device designed to accept data and perform prescribed mathematical and logical operations. Indicia 1090, such as numbers 1-12, may be included adjacent each fastener that indicates visual indication that any particular fastener 1-12 is properly tensioned or has become or never was properly tensioned. Tension indication signal 1086 may include information that programming of reader 80 and/or 84 may be utilized to provide that user interface 800 displays the particular fastener numbers that should be further inspected. Accordingly, software provides identification information for each individual RFID tag or a single RFID integrated circuit to allow a user to more quickly locate and tighten a loose fastener.

While the use of an RFID tag with each desired fastener or group of fasteners provides cost increase, the cost is offset by reduced manual labor to monitor the status of the fasteners. Thus, it is possible to reduce the overall costs of manufacturing with the present invention for those projects where monitoring fasteners is required. The present invention provides a relatively simple and low cost solution to reduce failures and the very high cost of potential of catastrophic failures. The history of the status of each fastener can be recorded and kept for maintenance purposes. A substantial amount of quality control labor can be saved due to the elimination of a need for manual checking of each fastener. Moreover, the present invention provides a much higher reliability that each fastener is tightened as compared to manual checks. The technology also allows the status of every fastener to be tracked over time.

Accordingly, the various RFID tags discussed herein can be made very simply for reliability. The circuit board materials can be high strength materials made to be shock robust and resistant to vibration failure. For operation in corrosive, acidic, environments, the RFID tags can be coated with corrosive resistant materials to make the tags corrosive resistant will not affect the operation. The torque or tension to turn the circuit on can be calibrated.

Accordingly, the present invention offers the ability to remotely and quickly verify that a given fastener is tensioned properly, upon initial installation as well as over the life of the fastener. The present invention provides the capability of using off the shelf sensor tag components and fasteners as well as reduced need for manual labor in monitoring the tension of the fasteners. This results in cost savings over the life of the fastener and host system, as well as improved fastener and safety performance.

The RFID fastener system 100 described herein can be used in many industries such as but not limited to aerospace, automotive, military systems, ship building, complex building construction, heavy equipment manufacturing, and other complex structures such as bridges, piers, dams, and recreational (theme park) equipment. The design of system 100 can be adapted to many specific usage parameters. The need for improved fastener monitoring is widely acknowledged by those of skill in the art due to catastrophic failures attributed to loose bolts.

As discussed above, many possible variations of circuit board, antenna arrangement, ring type, or other series connections to the RFID tag 10 could be utilized.

Terms such as tension used herein can relate to the torque, compression, force or the like for fasteners. Fasteners of many different types can be monitored with the present invention. The fasteners are not limited to specific materials such as metals, alloys, plastics, brass, or the like. As used herein, terms such as "sufficient tension" represent a necessary or predetermined amount of tension, torque, force or the like needed in a fastener application. As one possible example, sufficient tension indicates at a minimum that gap 42 is electrically closed. In this embodiment, "insufficient tension" indicates that gap 42 is not electrically closed.

Where applicable, corresponding terms to "sensor," RFID tags," "torque", "tension", "pressure", compression", "springs", "spring members" or other terms as determined by those of skill in the art can be considered equivalents for purposes of the attached claims for interpretation of infringing uses.

The foregoing description of the preferred embodiments of the invention has been presented for purposes of illustration and description only. It is not intended to be exhaustive or to limit the invention to the precise form disclosed; and obviously many modifications and variations are possible in light of the above teaching. Such modifications and variations that may be apparent to a person skilled in the art are intended to be included within the scope of this invention as defined by the accompanying claims.

The invention claimed is:

1. A wireless tag system configured to detect tension of at least one fastener in response to an interrogation signal from a wireless interrogator, comprising:
   at least one wireless tag, wherein each of said at least one wireless tag comprises:
      a ring circuit comprising two electrical contacts forming a contact gap between said two electrical contacts; and
      a first RFID integrated circuit electrically connected in series with said ring circuit,
   wherein said each of said at least one wireless tag is operable to transmit a tension indication signal when said contact gap is electrically closed; and
   at least one resilient member each comprising a first opening for receiving a corresponding said at least one fastener,
   wherein each of said at least one resilient member is responsive to a predetermined amount of tension applied to said corresponding said at least one fastener for movement from an uncompressed first configuration to a compressed second configuration,
   wherein in said compressed second configuration, said each of said at least one resilient member indicates said predetermined amount of tension applied to said corresponding said at least one fastener, and
   wherein in said compressed second configuration, said each of said at least one resilient member electrically closes a predetermined said ring circuit comprised of a predetermined said contact gap formed by a predetermined said two electrical contacts thereby enabling a predetermined said first RFID integrated circuit to respond to said interrogation signal and a predetermined said at least one wireless tag to transmit a corresponding said tension indication signal.

2. The system of claim 1,
   wherein in said uncompressed first configuration, said each of said at least one resilient member comprises an offset between itself and said predetermined said contact gap of said predetermined said ring circuit, and
   wherein in said compressed second configuration, said offset is eliminated.

3. The system of claim 1,
   wherein said at least one fastener is comprised of one fastener,
   wherein said at least one wireless tag is comprised of one wireless tag,
   wherein said at least one resilient member is comprised of one resilient member, and
   further comprising an antenna operable for transmitting said tension indication signal at a predetermined frequency of operation wherein said antenna is comprised of:
      a around metallization layer comprising a first and second distal end and a second opening for receiving said one fastener;
      an insulating substrate comprising a third opening for receiving said one fastener wherein said insulating substrate is positioned on top of said ground metallization layer and wherein said second and third openings are substantially aligned with respect to each other;
      a first surface metallization layer positioned in proximate relation to said one fastener and on top of a first portion of said insulating substrate; and
      a second surface metallization layer positioned in proximate relation to said one fastener, positioned on top of a second portion of said insulating substrate, and positioned in opposite spatial relation to said first surface metallization layer with respect to said one fastener,
   wherein said insulating substrate is sandwiched between said ground metallization layer and a combination of said first and second surface metallization layers,
   wherein said first surface metallization layer is shorted to said first distal end of said ground metallization layer, and
   wherein said second surface metallization layer is shorted to said second distal end of said ground metallization layer.

4. The system of claim 3,
   wherein said ring circuit is electromagnetically coupled to said first and second surface metallization layers and said antenna is thereby further comprised of said ring circuit, and
   when said one resilient member is in said compressed second configuration,
      said one resilient member makes contact with said contact gap of said ring circuit thereby electrically coupling said one resilient member to said first and second surface metallization layers,
      said antenna is thereby further comprised of said one resilient member, and
      said antenna continues to operate at said predetermined frequency of operation.

5. The system of claim 4,
   wherein said one wireless tag is further comprised of a supplemental circuit which is comprised of a second RFID integrated circuit and operable to produce a second wireless signal with identification information in response to said interrogation signal when said one resilient member is in either said uncompressed first configuration or said compressed second configuration, wherein said ring circuit and said supplemental circuit are in parallel relation to each other, and wherein said antenna transmits said second wireless signal at said predetermined frequency of operation (a) in response to said interrogation signal and (b) when said one resilient member is in either said uncompressed first configuration or said compressed second configuration.

6. The system of claim 5, further comprising software operable to analyze said second wireless signal as a means for determining if said interrogation signal is adequate for receiving said tension indication signal.

7. The system of claim 3, wherein said ring circuit is electromagnetically coupled to said first and second surface metallization layers and said antenna is thereby further comprised of said ring circuit.

8. The system of claim 1, wherein said each of said at least one wireless tag further comprises:
a supplemental circuit comprising a second RFID integrated circuit and operable to produce a second wireless signal with identification information in response to said interrogation signal when at least one corresponding said at least one resilient member is in either said uncompressed first configuration or said compressed second configuration.

9. The system of claim 8, further comprising software operable to analyze said second wireless signal as a means for determining if said interrogation signal is adequate for receiving said tension indication signal.

10. A wireless tag system configured to detect a tension applied to a fastener in response to an interrogation signal from a wireless interrogator, comprising:
a resilient member comprising a first opening for receiving said fastener wherein said resilient member is capable of compressing in a predetermined compressed configuration in response to said tension applied to said fastener;
a wireless tag controllably operable to transmit a tension indication signal indicating said tension applied to said fastener in response to said resilient member in said predetermined compressed configuration; and
an antenna operably connected to said wireless tag and operable to transmit said tension indication signal to said wireless interrogator at a predetermined frequency of operation, said antenna comprising:
a ground metallization layer comprising a first and second distal end and a second opening for receiving said fastener;
an insulating substrate comprising a third opening for receiving said fastener wherein said insulating substrate is positioned on top of said ground metallization layer and wherein said first, second, and third openings are substantially aligned with respect to each other;
a first surface metallization layer positioned in proximate relation to said fastener and on top of a first portion of said insulating substrate; and
a second surface metallization layer positioned in proximate relation to said fastener, positioned on top of a second portion of said insulating substrate, and positioned in opposite spatial relation to said first surface metallization layer with respect to said fastener, wherein said insulating substrate is sandwiched between said ground metallization layer and a combination of said first and second surface metallization layers, wherein said first surface metallization layer is electrically connected to said first distal end of said round metallization layer, and wherein said second surface metallization layer is electrically connected to said second distal end of said ground metallization layer.

11. The system of claim 10, wherein said wireless tag is configured to exclusively utilize power of said interrogation signal and wherein said interrogation signal provides si power for said wireless tag to wirelessly transmit said tension indication signal.

12. The system of claim 10, wherein said wireless tag is comprised of:
a ring circuit comprising two electrical contacts forming a contact gap between said two electrical contacts; and
a first RFID integrated circuit electrically connected in series with said ring circuit, wherein said contact gap of said ring circuit is electrically closed when said resilient member is in said predetermined compressed configuration.

13. The system of claim 12,
wherein said ring circuit is electromagnetically coupled to said first and second surface metallization layers and said antenna is thereby further comprised of said ring circuit, and
when said resilient member is in said predetermined compressed configuration,
said resilient member makes contact with said contact gap of said ring circuit thereby electrically coupling said resilient member to said first and second surface metallization layers, and
said antenna is thereby further comprised of said resilient member.

14. The system of claim 13, wherein said antenna is operable to transmit said tension indication signal at said predetermined frequency of operation.

15. The system of claim 12, wherein said wireless tag is further comprised of:
a supplemental circuit comprising a second RFID integrated circuit and operable to transmit a second wireless signal with identification information when said resilient member is either in or not in said predetermined compressed configuration.

16. The system of claim 15,
wherein said supplemental circuit is operable to transmit said second wireless signal with said identification information when said resilient member is only in said predetermined compressed configuration.

17. The system of claim 15, further comprising software operable to analyze said second wireless signal as a means for determining if said interrogation signal is adequate for receiving said tension indication signal.

18. The system of claim 15, wherein said ring circuit and said supplemental circuit are in parallel relation to each other.

19. The system of claim 12,
wherein said ring circuit is electromagnetically coupled to said first and second surface metallization layers and said antenna is thereby further comprised of said ring circuit.

20. The system of claim 19, wherein said antenna is operable to transmit said tension indication signal at said predetermined frequency of operation.

* * * * *